(12) United States Patent
Julaih et al.

(10) Patent No.: US 11,379,600 B2
(45) Date of Patent: Jul. 5, 2022

(54) MANAGEMENT OF ACTIONS AND PERMISSIONS TO APPLICATIONS IN AN ENTERPRISE NETWORK

(71) Applicant: Saudi Arabian Oil Company, Dhahran (SA)

(72) Inventors: Jafar A Julaih, Al Qatif (SA); Hanan A Dossary, Dammam (SA); Ibrahim A Alsalamah, Alkhobar (SA)

(73) Assignee: Saudi Arabian Oil Company, Dhahran (SA)

( * ) Notice: Subject to any disclaimer, the term of this patent is extended or adjusted under 35 U.S.C. 154(b) by 303 days.

(21) Appl. No.: 16/551,253

(22) Filed: Aug. 26, 2019

(65) Prior Publication Data

US 2021/0064771 A1    Mar. 4, 2021

(51) Int. Cl.
G06F 21/62    (2013.01)
G06F 21/12    (2013.01)

(52) U.S. Cl.
CPC ........ G06F 21/6218 (2013.01); G06F 21/121 (2013.01); G06F 2221/2145 (2013.01)

(58) Field of Classification Search
CPC .. G06F 21/6218; G06F 21/121; G06F 21/629; G06F 21/62; G06F 2221/2145
See application file for complete search history.

(56) References Cited

U.S. PATENT DOCUMENTS

| | | | |
|---|---|---|---|
| 8,181,016 B1 * | 5/2012 | Borgia .................. | G06F 21/604 726/4 |
| 10,229,191 B2 | 3/2019 | Faitelson et al. | |
| 2002/0184535 A1 | 12/2002 | Moaven et al. | |
| 2007/0244899 A1 | 10/2007 | Faitelson et al. | |
| 2008/0256458 A1 | 10/2008 | Aldred et al. | |
| 2018/0150650 A1 | 5/2018 | Saunders et al. | |
| 2018/0255101 A1 * | 9/2018 | Adam ..................... | H04L 63/10 |
| 2019/0230088 A1 | 7/2019 | Rice et al. | |

OTHER PUBLICATIONS

Overview of Managing Access Permissions to Your AWS Serverless Application Repository Resources, retrieved Jun. 12, 2019, https://docs.aws.amazon.com/serverlessrepo/latest/devguide/access-control-overview.html.
Overview of Managing Access Permissions to Your Amazon Simple Queue Service Resource, retrieved Jun. 12, 2019, https://docs.aws.amazon.com/AWSSimpleQueueService/latest/SQSDeveloperGuide/sqs-overview-of-managing-access.html.
International Search Report and Written Opinion in Corresponding PCT Application No. PCT/US2020/046602 dated Oct. 9, 2020. 12 pages.

\* cited by examiner

*Primary Examiner* — Daniel B Potratz
(74) *Attorney, Agent, or Firm* — Leason Ellis LLP (57) ABSTRACT

A method of actions and permissions ownership (APO) for managing applications of an enterprise is provided. The method includes: receiving a request from an owner of a role to modify an action or permission of the role or to add the action or permission to the role. The action or permission controls access to a corresponding one of the applications. In response to receiving such a request, the method includes looking up an owner of the corresponding application in a non-transitory electronic APO database, requesting an approval from the corresponding application owner to modify or add the action or permission, receiving the approval to modify or add the action or permission, and, in response to receiving the approval, updating a non-transitory electronic role database to modify the action or permission of the role or to add the action or permission to the role.

15 Claims, 2 Drawing Sheets

FIG. 1

Actions and Permissions Ownership (APO) System 100

APO Database
110

Application Owner (Proponent)
150

APO Processor
130

Security or Audit
170

Role Processor
140

Role Database
120

Role Owner
160

FIG. 2

MANAGEMENT OF ACTIONS AND PERMISSIONS TO APPLICATIONS IN AN ENTERPRISE NETWORK

FIELD OF THE DISCLOSURE

The present disclosure relates in general to enterprise resource planning (ERP) and in particular to a process for actions and permissions ownership in an ERP setting.

BACKGROUND OF THE DISCLOSURE

An ERP product, such as Systems, Applications, and Products in Data Processing (abbreviated SAP), provides integrated management of the main business processes of an enterprise, often in real-time and mediated by software and technology. Part of the ERP product is the management of the enterprise's data. To maintain security, integrity, and availability of the enterprise's data, the ERP product limits access by the employees of the enterprise to the data based on an employee's role (or roles) in the enterprise. Accordingly, by using interfaces in the ERP product to define the roles of the enterprise and to assign each employee to one or more roles, an enterprise can safeguard its data to the extent that the roles are properly defined and the employees are properly assigned to the roles. However, enterprises can be large, and the proper definition of the different roles within the enterprise to safeguard the security, integrity, and availability of the enterprise's data to the appropriate employees can be a challenging task.

It is with respect to these and other problems in the art that the present disclosure is directed to provide a technical solution for effective management of actions and permissions ownership in an enterprise environment.

SUMMARY OF THE DISCLOSURE

According to an embodiment of the present disclosure, a method of actions and permissions ownership (APO) for managing applications of an enterprise is provided. The method includes: receiving, by an APO circuit from an owner of a role, a request to modify an action or permission of the role or to add the action or permission to the role, wherein the action or permission controls access to a corresponding one of the applications; in response to receiving the request, looking up, by the APO circuit in a non-transitory electronic APO database, an owner of the corresponding application; requesting, by the APO circuit from the corresponding application owner, an approval to modify or add the action or permission; receiving, by the APO circuit from the corresponding application owner, the approval to modify or add the action or permission; and in response to receiving the approval, updating, by the APO circuit, a non-transitory electronic role database to modify the action or permission of the role or to add the action or permission to the role.

In an embodiment, the method further includes: receiving, by the APO circuit from the corresponding application owner, a request to register the action or permission in the APO database; and in response to receiving the request to register the action or permission, updating, by the APO circuit, the APO database to register the action or permission as being owned by the corresponding application owner.

In an embodiment, the method further includes: receiving, by the APO circuit from the corresponding application owner, a request to identify roles that include the action or permission; in response to receiving the request to identify the roles, looking up, by the APO circuit in the role database, the roles that include the action or permission; and providing, by the APO circuit to the corresponding application owner, the roles that include the action or permission.

In an embodiment, the method further includes: receiving, by the APO circuit from the corresponding application owner, a request to modify the action or permission of one of the roles or to remove the action or permission from the one of the roles; and in response to receiving the request to modify or remove the action or permission, updating, by the APO circuit, the role database to modify the action or permission of the one of the roles or to remove the action or permission from the one of the roles.

In an embodiment, the method further includes: receiving, by the APO circuit from the corresponding application owner, a waiver to approve requests for the role for a particular period of time; and in response to receiving the waiver, updating, by the APO circuit, the role database to modify the action or permission of the role or to add the action or permission to the role for the particular period of time.

In an embodiment, the method further includes: receiving, by the APO circuit from the role owner, a request to modify another action or permission of the role or to add the other action or permission to the role, wherein the other action or permission further controls access to the corresponding application; and in response to receiving the waiver and to receiving the request to modify or add the other action or permission, updating, by the APO circuit, the role database to modify the other action or permission of the role or to add the other action or permission to the role for the particular period of time.

In an embodiment, the method further includes: receiving, by the APO circuit from the corresponding application owner, a rejection to modify or add the action or permission; and in response to receiving the rejection, notifying, by the APO circuit, the role owner of the rejection.

According to another embodiment of the present disclosure, an actions and permissions ownership (APO) device for managing applications of an enterprise is provided. The APO device includes: logic to receive a request from an owner of a role to modify an action or permission of the role or to add the action or permission to the role, wherein the action or permission controls access to a corresponding one of the applications; logic to, in response to receiving the request, look up an owner of the corresponding application in a non-transitory electronic APO database; logic to request an approval from the corresponding application owner to modify or add the action or permission; logic to receive the approval from the corresponding application owner to modify or add the action or permission; and logic to, in response to receiving the approval, update a non-transitory electronic role database to modify the action or permission of the role or to add the action or permission to the role.

In an embodiment, the APO device further includes: logic to receive a request from the corresponding application owner to register the action or permission in the APO database; and logic to, in response to receiving the request to register the action or permission, update the APO database to register the action or permission as being owned by the corresponding application owner.

In an embodiment, the APO device further includes: logic to receive a request from the corresponding application owner to identify roles that include the action or permission; logic to, in response to receiving the request to identify the roles, look up the roles that include the action or permission in the role database; and logic to provide the roles that include the action or permission to the corresponding application owner.

In an embodiment, the APO device further includes: logic to receive a request from the corresponding application owner to modify the action or permission of one of the roles or to remove the action or permission from the one of the roles; and logic to, in response to receiving the request to modify or remove the action or permission, update the role database to modify the action or permission of the one of the roles or to remove the action or permission from the one of the roles.

In an embodiment, the APO device further includes: logic to receive a waiver from the corresponding application owner to approve requests for the role for a particular period of time; and logic to, in response to receiving the waiver, update the role database to modify the action or permission of the role or to add the action or permission to the role for the particular period of time.

In an embodiment, the APO device further includes: logic to receive a request from the role owner to modify another action or permission of the role or to add the other action or permission to the role, wherein the other action or permission further controls access to the corresponding application; and logic to, in response to receiving the waiver and to receiving the request to modify or add the other action or permission, update the role database to modify the other action or permission of the role or to add the other action or permission to the role for the particular period of time.

In an embodiment, the APO device further includes: logic to receive a rejection from the corresponding application owner to modify or add the action or permission; and logic to, in response to receiving the rejection, notify the role owner of the rejection.

According to yet another embodiment of the present disclosure, a non-transitory computer-readable medium (CRM) storing instructions that, when executed on a computer processor, cause the processor to carry out a process of actions and permissions ownership (APO) for managing applications of an enterprise is provided. The process includes: receiving a request from an owner of a role to modify an action or permission of the role or to add the action or permission to the role, wherein the action or permission controls access to a corresponding one of the applications; in response to receiving the request, looking up an owner of the corresponding application in a non-transitory electronic APO database; requesting an approval from the corresponding application owner to modify or add the action or permission; receiving the approval from the corresponding application owner to modify or add the action or permission; and in response to receiving the approval, updating a non-transitory electronic role database to modify the action or permission of the role or to add the action or permission to the role.

In an embodiment, the process further includes: receiving a request from the corresponding application owner to register the action or permission in the APO database; and in response to receiving the request to register the action or permission, updating the APO database to register the action or permission as being owned by the corresponding application owner.

In an embodiment, the process further includes: receiving a request from the corresponding application owner to identify roles that include the action or permission; in response to receiving the request to identify the roles, looking up the roles that include the action or permission in the role database; and providing the roles that include the action or permission to the corresponding application owner.

In an embodiment, the process further includes: receiving a request from the corresponding application owner to modify the action or permission of one of the roles or to remove the action or permission from the one of the roles; and in response to receiving the request to modify or remove the action or permission, updating the role database to modify the action or permission of the one of the roles or to remove the action or permission from the one of the roles.

In an embodiment, the process further includes: receiving a waiver from the corresponding application owner to approve requests for the role for a particular period of time; and in response to receiving the waiver, updating the role database to modify the action or permission of the role or add the action or permission to the role for the particular period of time.

In an embodiment, the process further includes: receiving a request from the role owner to modify another action or permission of the role or to add the other action or permission to the role, wherein the other action or permission further controls access to the corresponding application; and in response to receiving the waiver and to receiving the request to modify or add the other action or permission, updating the role database to modify the other action or permission of the role or to add the other action or permission to the role for the particular period of time.

In an embodiment, the process further includes: receiving a rejection from the corresponding application owner to modify or add the action or permission; and in response to receiving the rejection, notifying the role owner of the rejection.

These and other aspects and features can be appreciated from the following description of certain embodiments of the disclosed invention and the accompanying drawings and claims.

DETAILED DESCRIPTION OF CERTAIN EMBODIMENTS OF THE DISCLOSURE

Disclosed herein are a method, a system, and a computer-readable medium (CRM) for actions and permissions ownership (APO) for managing access of an enterprise's data in an enterprise resource planning (ERP) setting. According to various embodiments of the present disclosure, the process of assigning the appropriate level of data access to the appropriate individuals in the enterprise is automated and streamlined. This helps achieve the enterprise's goals of maintaining data security, integrity, and availability to increase or maximize the enterprise's output while reducing or minimizing the enterprise's exposure to undesired access to its data.

To better abstract and organize the enterprise's data, the individuals associated with an enterprise access the enterprise's data through applications. For ease of description, such individuals are referred to herein as "employees," but more generally the associated individuals can include persons who are not employees but who are otherwise accorded access to one or more portions of a network or subnetwork of the enterprise. Here, access can be of any type, such as creating, sharing, modifying, viewing, deleting, and moving applications, or just having access to use particular applications, to name a few types of access. Similarly, applications can be any type of computer applications, programs, or other automated processes for accessing the data. Each application is associated with a corresponding set of actions for performing these accesses. Here, an action represents a transaction linked with the application that allows the user to execute a certain functionality on data associated with the application. Actions define how an application accesses (e.g., provides interfaces to) its corresponding data. Permissions, on the other hand, refer to the level of access (e.g., read, write, append, erase, permit, etc.) for the various actions. Each action can have several different permissions associated with the action depending on the level of access needed by a user or group of users. An action and permission pair defines a particular access level (permission) for a particular action for a particular application's data.

To further abstract this data accessibility model, a role is a combination of one or more such action and permission pairs ("AP pair") that can be part of the same application or span multiple applications as needed. Each AP pair provides access to a corresponding action of an application and at a corresponding permission level. A role represents a job description's data access requirements for fulfilling the responsibilities of the job. A role is defined by the combination of AP pairs that make up the role. An employee of the enterprise is assigned one or more roles that are appropriate to perform his or her responsibilities while safeguarding the company's data from activities of the employee that are not appropriate for his or her responsibilities.

However, when the enterprise is large, such as including multiple ERP systems to run and manage the enterprise, the number of applications, actions, and permissions (and AP pairs) can also be quite large. By extension, the number of possible roles is almost without limit. This can present a challenge to the security team, who must maintain confidentiality, integrity, and availability of the company data in an appropriate manner. Accordingly, roles are maintained by certain individuals in the enterprise (such as data security professionals) and are created and modified as needed and as foreseen by corresponding role owners. Unfortunately, the role owners (e.g., anyone able to maintain AP pairs) are not necessarily in the best position to decide what levels of access to permit for particular actions belonging to corresponding applications.

Nevertheless, to be effective, roles should be able to abstract the data accessibility challenges of enterprises, such as making data freely accessible to those that need it, while denying or restricting access to those that lack the need for such access. As such, roles should encompass all the AP pairs that properly define the role, which can span many ERP systems, applications, actions, and permission levels. Application owners (e.g., data proponents for the data managed and accessed through their corresponding applications) are in a good position to know what access levels are appropriate for particular roles. However, the challenges of involving the corresponding application owners in the role defining process for a large enterprise can be quite daunting. Equally challenging is providing application owners a corresponding presentation and control of all the various roles that permit access to the applications' data.

Thus, and in accordance with some embodiments of the present disclosure, an automated actions and permissions ownership (APO) process is provided. The actions and permissions of each application are owned, such as by an owner or proponent of the application. These ownerships are maintained by an automated (such as computer-implemented) APO system in a central database, such as a hardware-based, non-transitory storage medium (e.g., magnetic disk or solid state storage). Each data proponent (e.g., owner of an application responsible for accessing the data) is involved in the role creation and maintenance process for any AP pair included in the corresponding role. As such, when creating a new role or modifying an existing role, the corresponding data proponents affected by the role are involved. The APO process is automated in that it executes in electronic hardware, such as dedicated hardware (e.g., FPGA, ASIC, gate-level logic, and the like), shared hardware (e.g., computer processor or microprocessor or server, executing computer instructions or programs stored in addressable storage such as RAM, ROM, flash memory, solid state memory, disk storage, to name a few), or software/firmware configured to carry out the functions described herein.

In an embodiment, the APO process allows each data owner (e.g., corresponding application owner or proponent) in a system to register actions and permissions that are used to access or manipulate data under the data owner's ownership. The APO process provides preventive security controls over the process of granting actions and permissions to end users. In an embodiment, each data proponent in a system registers their application's corresponding actions and permissions in a central database (e.g., a non-transitory electronic APO database, such as on a disk drive that is part of a network file system). The APO database can be accessed through a network, such as Ethernet, local area network (LAN), wide area network (WAN), Internet, or the cloud. In addition, the APO process provides each proponent (e.g., application owner) the ability to view the use of their actions and permissions by different roles across a given system. In an embodiment, the APO process outputs to a display or other output device the different roles in the system that have AP pairs using an action or permission owned by the proponent. Filters can be specified to limit the output to only a particular one or subset of actions or permissions of the proponent (or application owner).

In an embodiment, the APO process alerts the proponent of an application anytime a role owner attempts to add or modify an AP pair whose action or permission is owned by the proponent. The proponent is given the opportunity to approve or reject the addition or modification to the role. If approved, a role database (e.g., a hardware-based, non-transitory electronic database, such as maintained on a network addressable disk drive or other storage device) is updated to reflect the added/modified AP pair. A log entry is also made (such as in the APO database) of the addition or modification, such as for generating and maintaining a log history of all APO activity. If rejected, the owner of the role is notified and no update of the role database takes place. Notifications can be by any of a variety of forms of electronic messaging to the role owner. A corresponding log entry is also made of the rejection. In an embodiment, the APO process provides others, such as members of a security team or audit team, the ability to examine the security state in a given system. This can include, for example, examining the log histories of the APO activity.

In an example embodiment, the APO process is implemented as an application in a Systems, Applications & Products (SAP) installation as part of an ERP setting. Various computing resources, such as server and client computers together with network-accessible non-transitory storage devices are used to implement the SAP installation and its corresponding applications and data in an enterprise network of which system 100 is a part (see FIG. 1). Here, the APO application is integrated with the Business Role Management (BRM) application as part of the SAP governance, risk management, and compliance (GRC) framework. The APO application (and its corresponding APO database) interfaces with the BRM application (and its corresponding role database) to involve the application owners (proponents) in the role creation and modifications. For example, the SAP GRC Access Control application can be integrated with the APO application to manage the actions and permissions ownership.

In some embodiments, the APO process enables a proponent of an application within a system to register (e.g., claim ownership of) all actions and permissions owned by the proponent's organization. This helps to protect these registered actions and permissions from unauthorized access across the enterprise. In addition, the APO process enables a proponent of an application within a system to keep an eye on their registered actions and permissions, such as by providing an interface to view all roles using these actions and permissions. The APO process further allows the proponent to restrict or delete such actions and permissions from the corresponding roles. In this fashion, the APO process ensures that the proponent's actions and permissions are secured and added only to eligible users through authorized mechanisms. Further, the APO process provides the enterprise's security and audit teams with tools to monitor the security state of the roles and their corresponding actions and permissions across the enterprise.

In an embodiment, when a role owner submits a proposed role (or modifies an existing role) to the APO system, the APO system uses the APO database to automatically look up the owners (data proponents) of the corresponding applications whose AP pairs are being added or modified in the role. The APO system automatically queries each such data proponent to see if they agree to the corresponding AP pairs being added/modified in the role. Upon receiving agreement to some or all such queries, the APO system automatically approves the role additions or modifications to the extent approved by the corresponding data proponents.

In example embodiments, the APO process is implemented in any ERP system that uses actions and permissions to control access to data. Each role owner defines their role to include those AP pairs needed to perform the job represented by the role. For each AP pair, the APO process sends a request to the corresponding proponent (e.g., application owner of the action and permission, as maintained in the APO database). The proponent can approve the AP pair in the role, in which case the role database is updated to include the AP pair for that role. The proponent can also reject the request, in which case the role database is not updated and the role owner is informed or notified of the rejection.

In an embodiment, the proponent can also issue a waiver for the role. The waiver is issued for a limited period of time (such as a particular or specified period of time), during which the ownership of the actions and permissions for that proponent are waived for that role. This effectively transfers the ownership of the proponent's actions and permissions for that role to that of the role owner during this limited period. After the limited period, the actions and permissions revert back to the proponent's ownership, who is free to approve or reject/modify them as appropriate.

Figure 1:
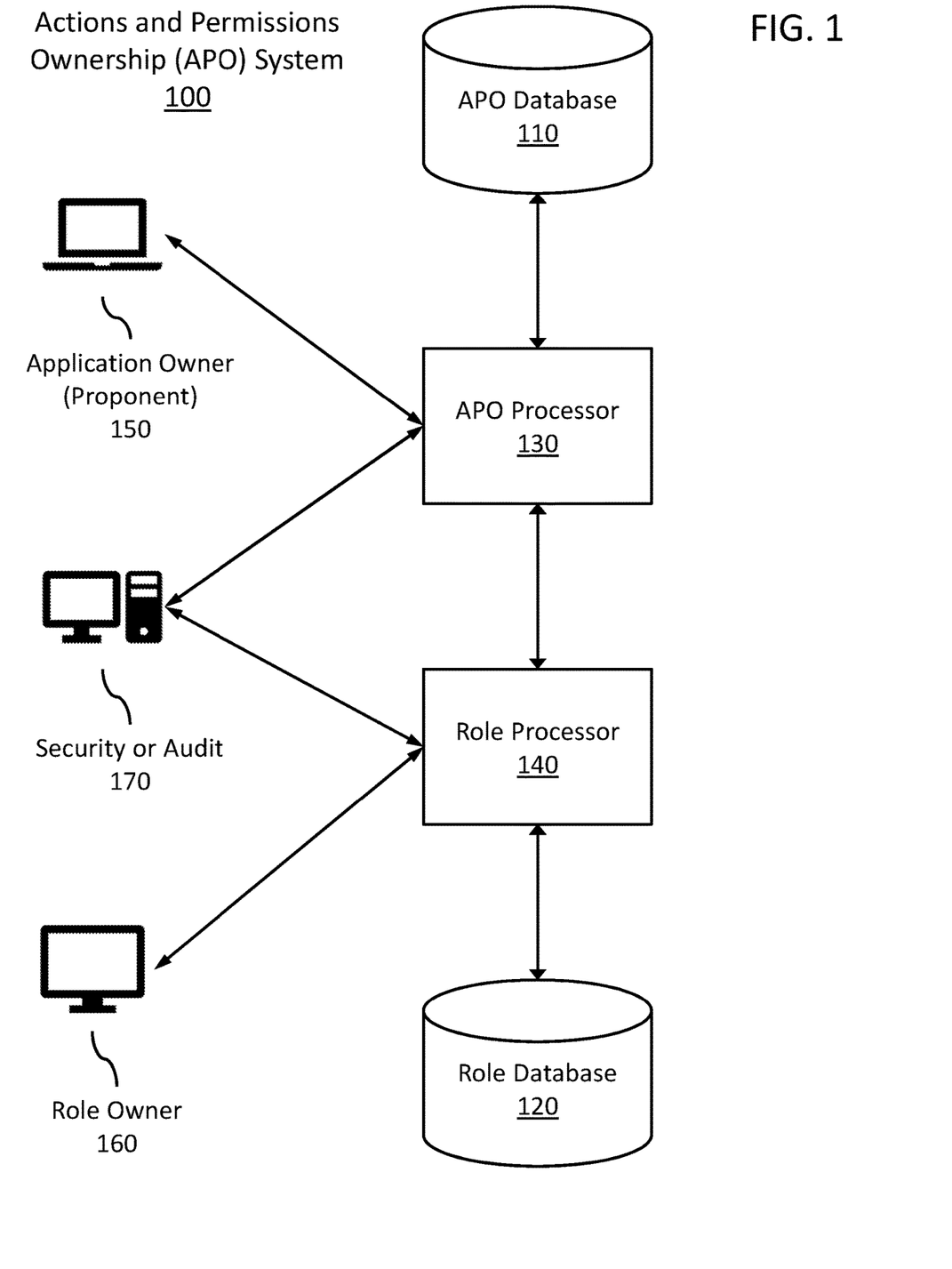
FIG. 1 is a block diagram of an example actions and permissions ownership (APO) system for managing applications of an enterprise, according to an embodiment of the present disclosure.

FIG. 1 is a block diagram of an example actions and permissions ownership (APO) system 100 for managing applications within a network of an enterprise, according to an embodiment of the present disclosure. The enterprise can span many locations, servers, sub-networks, and the like, though only the relevant components of the network are illustrated in FIG. 1. The enterprise controls access to its data through applications (e.g., computer applications, such as ERP applications) that provide access to the data through corresponding actions and permissions. The actions and permissions of an application are owned by the application's owner (or proponent). The enterprise uses roles to organize different levels of access to data based on corresponding job descriptions represented by the roles. Each role has a set of AP pairs (e.g., an action and corresponding permission level associated with the action) that define the role. Each role is owned by a corresponding role owner 160, who oversees the AP pairs that make up the role. A role database 120 maintains the current AP pairs of each role. A role processor 140 (e.g., circuit, module, hardware, software, or a combination of the foregoing) manages the role database 120 and interfaces all requests related to the roles and their management.

In an embodiment, the APO system 100 is part of a data center which includes the computing resources of a business location, such as all or part of a building or multiple buildings. The data center includes various server computers (some of which may be virtual servers running on a hypervisor-equipped physical server). The physical servers can include one or more processors or microprocessors, memory such as random-access memory (RAM), non-transitory storage such as disk drives, and software or firmware to be executed by the processors using the memory, all of which are conventional and none of which are illustrated, but which should be understood to be part of the APO system 100 being illustrated or computing environment in which the APO system 100 is located together with other physical servers, storage devices, firewalls, routers and the like to further constitute the network of an enterprise. The servers of the data center are interconnected with a network that can be hardwired, for example, using cable media such as wires and optical fibers (e.g., a local area network (LAN) such as Ethernet). The network can also include wireless connections between devices, such as a wireless LAN (WLAN, e.g., Wi-Fi or WiMAX) or cellular (e.g., CDMA or GSM). The network can also be a combination of wired and wireless links between devices.

The different hardware devices illustrated in FIG. 1 can include multiple computing devices having one or more processing units (e.g., one or more microprocessors, digital signal processors (DSPs), application-specific processing units, to name a few) and memory devices (e.g., cache memory, main memory such as random-access memory (RAM), flash and other non-volatile memory, and the like). In different embodiments, these devices can be programmed with executable instructions (such as software or firmware) or otherwise implemented with custom logic (such as a field-programmable gate array (FPGA) or application-specific integrated circuit (ASIC)) that configure the devices to implement the various APO functions further described herein.

When the application owner creates a new action or permission, the application owner at an application owner device 150 registers the new action or permission with an APO processor 130 (e.g., circuit, module, hardware, software, firmware, or a combination of the foregoing) For example, the application owner device 150 can be a workstation, desktop, laptop, tablet, smartphone, or client computer (e.g., with a non-transitory storage device, a display device, and input devices such as a keyboard and a mouse)

to communicate the request over a network to the APO processor 130. The APO processor 130 is configured by code executing in a processor to manage the ownership of the actions and permissions in the enterprise through an APO database 110. The APO database 110 stores data which identifies all the actions and permissions in the enterprise along with their corresponding owners (proponents). When the role owner at a role owner device 160 proposes or modifies a role, the request is sent to the role processor 140. For example, the role owner can use a computer (such as a client or other computer similar to or different than that of the application owner device 150) and communicate with the role processor 140 through a network such as a local area network (LAN) using any conventional communication protocol.

The role processor 140 is configured by code executing in a machine to respond to received requests and, working with the APO processor 130, determine the application owner for each proposed or modified AP pair (e.g., by looking up the owners in the APO database 110). The APO processor 130 is programmed to then send a request to the device 150 of each application owner whose AP pair is being added or modified in the role. The application owner accepts or rejects the request and communicates this decision to the APO processor 130. Code executing in the APO processor 130 then assembles the various responses and communicates these decisions for the role to the role processor 140, which is suitably configured by code to update the role database 120 (for accepted requests) or notify the role owner (for rejected requests), as applicable, by communications to the role owner device 160.

In an embodiment, the application owner can issue a waiver for a particular role by conventional communications from the application owner device 150. The waiver is issued with a time limit, such as a terminating period of time or date. During the waiver period for the role, requests to add or modify AP pairs in the role for actions or permissions owned by the application owner are waived. As such, the resulting AP pairs are automatically added or modified in the role and the role database 120 is updated accordingly for the duration of the waiver, at which point they are removed (or re-requested of the proponent). In an embodiment, the waiver also requires a justification, which can be used by security or audit teams to make sure such waivers are proper.

In some embodiments, a security team member at a security or audit device 170 oversees the updates to the APO database 110 and role database 120, such as to prevent unauthorized or inappropriate changes to these databases. The security team member accesses the APO processor 130 and role processor 140 through a computing device 170, such as a desktop, laptop, or tablet computer the same as or different than that of the application owner device 150 or the role owner device 160. In some embodiments, each database transaction, role request, or proponent request together with their corresponding results or dispositions generates a corresponding log entry. In such cases, the audit team member can get a snapshot of the security state of the APO system 100 by examining the log history for some or all of the recent transactions and requests that have been processed by the APO processor 130 and role processor 140. The log history can be filtered, for example, by role, application, action, or permission, to name a few. In some embodiments, a security or audit team member 170 can request a compliance report from the APO processor 130 or role processor 140. The compliance report includes the actions and permissions used by the different role owners. An audit team member, for example, can then determine if the proponent and security team comply with APO guidelines or not.

In some embodiments, each application owner can also request a compliance report for their own actions and permissions via communications from the application owner device 150. The compliance report, for example, lists the registered actions and permissions of the proponent together with all roles that include AP pairs owned by the proponent. The compliance reports are configured by code implemented in the system 100 and can alert the application owner by a message to the application owner device 150, for example, if any of their AP pairs have been improperly incorporated in a role or assigned to an unauthorized role. The compliance reports can also provide the proponent (e.g., application owner) with a complete picture of the extent of their data exposure for their application based on the different AP pairs in the different roles.

In some embodiments, the application owner can remove or modify (e.g., lower the permission level of) any owned AP pair belonging to a role for which the application owner does not authorize (or no longer authorizes) to contain such an AP pair, by sending requests from the application owner device 150. Such requests, for example, can be directed to the APO processor 130 from the device 150 over conventional network connections using conventional communication protocols, and the APO processor can be configured by code to coordinate with the role processor 140 to update the role database 120 accordingly. In these cases, the role owner is notified by messages sent by code executing in the role processor 140 of such changes to its role. The role owner is then free to re-request the access, request a different AP pair or pairs (such as at lower access levels or from different applications), or other appropriate action through the role processor 140 in response.

In various embodiments, the APO system 100 provides for a process that can be used by a data proponent at the device 150 in the system 100 (for example, an SAP system) to register and protect their owned actions and permissions from unauthorized access and manipulation of enterprise confidential or sensitive data. The APO process comprises code executing in a processor which is configured so that the APO 130 applies a preventive control to ensure only authorized personnel has access to company confidential or sensitive data. The APO process enables data proponents at device 150 to register or protect their owned actions and permissions in a centralized database (such as APO database 110). The APO process allows full involvement of the data proponent in the actions and permissions management process. In addition, the APO process provides for compliance reports based on the registered or protected actions and permissions of, for example, individual application owners or the entire system 100.

While the APO processor 130 and role processor 140 are illustrated in FIG. 1 as different entities, in some embodiments, they are implemented in software on the same server or processor. In general, different computing units may be combined or further separated as appropriate in the different embodiments, and may be implemented in hardware (e.g., customized or dedicated logic such as ASIC or FPGA), software (e.g., instructions for execution on a computer processor), or some combination of the two (e.g., firmware on a dedicated processing unit).

Figure 2:
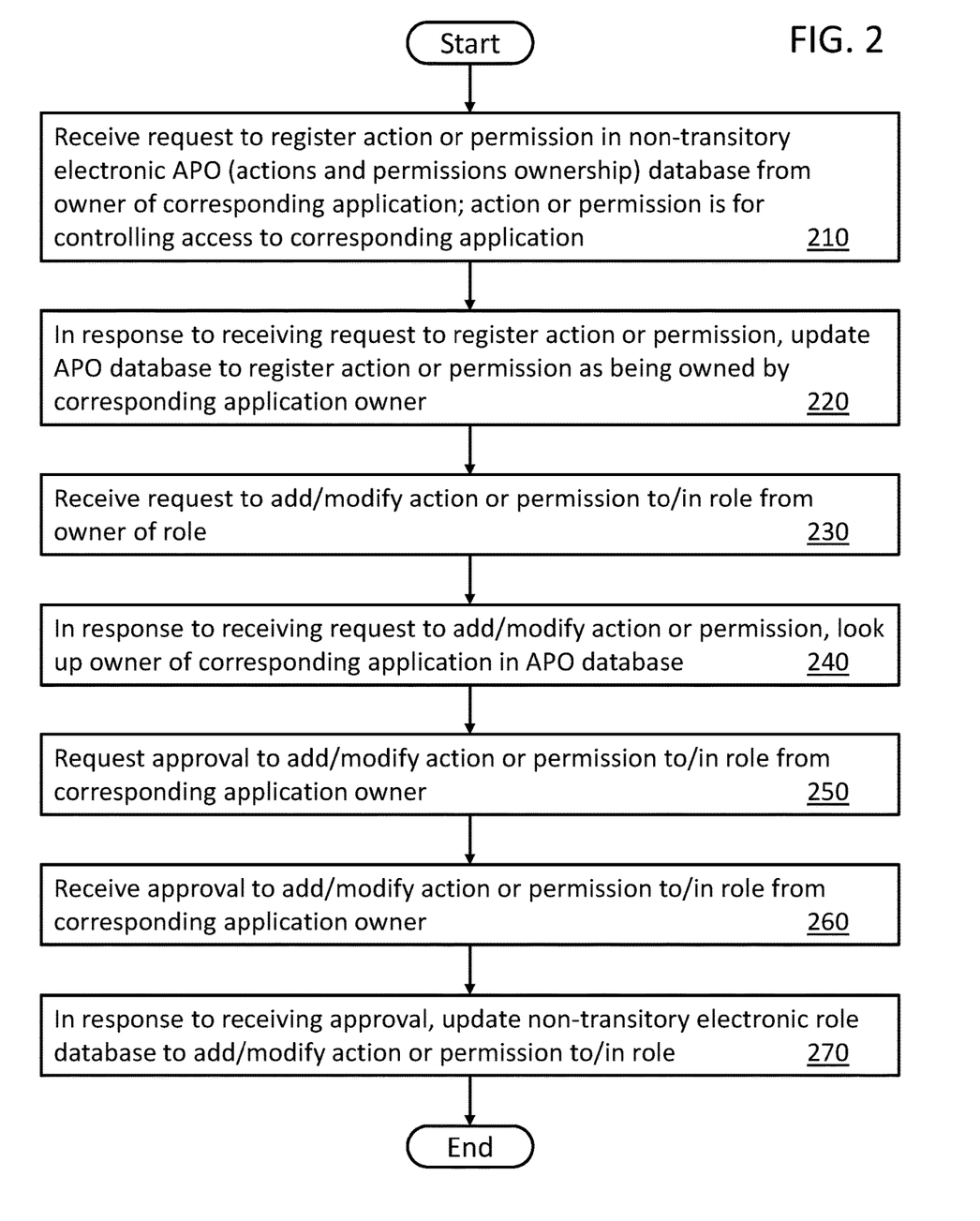
FIG. 2 is a flow chart of an example APO method for managing applications of an enterprise, according to an embodiment of the present disclosure.

FIG. 2 is a flow chart of an example APO method 200 for managing applications of an enterprise, according to an embodiment of the present disclosure. This and other methods disclosed herein can be performed on an APO device or circuit, such as the APO processor 130 of FIG. 1 (possibly in conjunction with the role processor 140). The APO device can be, for example, a dedicated hardware appliance or bare-metal server, or a portion of a hardware server or computer system. The APO device can include a non-transitory computer readable medium (CRM, such as read-only memory (ROM), flash drive, or disk drive) storing instructions that, when executed on one or more processors of the APO device, cause the method 200 (or other disclosed method) to be carried out. It should be noted that in other embodiments, the order of the operations can be varied, and that some of the operations can be omitted.

The enterprise is a network of machines interconnected in an ERP setting which executes applications on computing devices or other hardware to control access to corresponding data of the enterprise. The enterprise further uses roles to assign access of the corresponding data to users through actions and permissions of the respective applications. Processing begins for method 200 with receiving 210 a request to register an action or permission in a non-transitory electronic APO database (such as APO database 110) from an owner of a corresponding one of the applications such as an application owner at an application owner device 150. The action or permission is for controlling access to the corresponding application. In response to receiving the request to register the action or permission, the method 200 further includes updating 220 the APO database to register the action or permission as being owned by the corresponding application owner. The method 200 further includes receiving 230 a request to add to an action or permission of a role from an owner of the role, or to modify the action or permission of such role.

In response to receiving the request to add or modify the action or permission, the method 200 further includes looking 240 up the owner of the corresponding application in the APO database. The method 200 further includes requesting 250 an approval to add the action or permission to the role from the corresponding application owner or to modify the action or permission of such role, and receiving 260 the approval from the corresponding application owner. In response to receiving the approval, the method 200 further includes updating 270 a non-transitory electronic role database (such as role database 120) so as to add the action or permission or modify the action or permission of the role.

It should be understood that various combination, alternatives, and modifications of the present disclosure could be devised by those skilled in the art. The present disclosure is intended to embrace all such alternatives, modifications, and variances that fall within the scope of the appended claims.

It should be understood that embodiments of the present disclosure may be implemented by software, by hardware, or by any combination of software and/or hardware as may be appropriate for specific applications or design requirements. In some embodiments, the system of the disclosure can further include general, multi-purpose and/or specific processors, circuits, logic systems, operators, circuitry, blocks, units, and/or sub-units that can perform any operation, or any combination of operations, described above.

In some embodiments of the disclosure, the system can further include memory units, buffers, and/or registers for temporary and/or permanent storage of data. These units (e.g., processor and memory units), or any combination thereof, can be referred to herein as "circuitry," and can be internal and/or external to a communication node, in whole or in part. Accordingly, embodiments of the disclosure can include an article comprising a storage medium (such as a non-transitory storage medium) having stored thereon instruction that, when executed by a processing device, perform the operations of the actions and permissions ownership (APO) for managing applications of an enterprise in accordance with the disclosed embodiments.

The flowchart and block diagrams in the figures illustrate the architecture, functionality, and operation of possible implementations of systems, methods, and computer program products according to various embodiments and arrangements. In this regard, each block in the flowchart or block diagrams can represent a module, segment, or portion of code, which comprises one or more executable instructions for implementing the specified logical function(s). It should also be noted that, in some alternative implementations, the functions noted in the block may occur out of the order from that noted in the figures. For example, two blocks shown in succession may, in fact, be executed substantially concurrently, or the blocks may sometimes be executed in an alternative order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It should be further appreciated that more or fewer operations can be performed than shown in the figures and described. It is to be understood that like numerals in the drawings represent like elements through the several figures, and that not all components and/or operations described and illustrated with reference to the figures are required for all embodiments or arrangements.

The terminology used herein is for the purpose of describing particular embodiments only and is not intended to be limiting of the disclosure. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, operations, elements, and/or components, but do not preclude the presence or addition of one or more other features, integers, operations, elements, components, and/or groups thereof.

Also, the phraseology and terminology used herein is for the purpose of description and should not be regarded as limiting. The use of "including," "comprising," "having," "containing," "involving," and variations thereof herein, is meant to encompass the items listed thereafter and equivalents thereof as well as additional items.

It is to be understood that any structural and functional details disclosed herein are not to be interpreted as limiting the systems and methods, but rather are provided as a representative embodiment and/or arrangement for teaching one skilled in the art one or more ways to implement the systems and methods. Descriptions of well-known components (such as an Ethernet network infrastructure) and processing techniques may be omitted for ease of understanding the embodiments of the disclosure. It is to be further understood that like numerals in the drawings represent like elements through the several figures, and that not all components and/or operations described and illustrated with reference to the figures are required for all embodiments or arrangements.

While the invention which is the subject of the present disclosure has been particularly shown and described with reference to certain embodiments thereof, it will be understood by those skilled in the art that various changes in form and details may be made therein without departing from the spirit and scope of the invention. Therefore, the scope of the invention is indicated by the appended claims, rather than by the foregoing description. All changes that come within the meaning and range of equivalency of the claims are to be embraced within their scope.

What is claimed is:

1. A method of actions and permissions ownership (APO) for managing access to data of an enterprise for a plurality of roles as controlled by a plurality of applications of the enterprise, each application accessing the data through a respective plurality of actions, each action having a respective plurality of permission levels with which to restrict the data access by the action, the method comprising:

receiving, by an APO circuit from an owner of a first role of the plurality of roles, a request to modify the data access for the first role as controlled by a first application of the plurality of applications through a first action of the respective plurality of actions of the first application, wherein the request is further to modify the data access for the first role by the first action to a first permission level of the respective plurality of permission levels of the first action;

in response to receiving the request, looking up, by the APO circuit in a non-transitory electronic APO database, an owner of the first application;

requesting, by the APO circuit from the first application owner, an approval to modify the data access for the first role by the first action to the first permission level;

receiving, by the APO circuit from the first application owner, the approval or a rejection to modify the data access for the first role;

in response to receiving the approval, updating, by the APO circuit, a non-transitory electronic role database to modify the first role to reflect the request;

in response to receiving the rejection, notifying, by the APO circuit, the first role owner of the rejection;

receiving, by the APO circuit from the first application owner, a request to register a second action to the respective plurality of actions of the first application along with a respective plurality of permission levels of the second action in the APO database; and in response to receiving the request to register the second action, updating, by the APO circuit, the APO database to register the second action and the respective plurality of permission levels of the second action to the first application in the APO database.

2. The method of claim 1, further comprising:
receiving, by the APO circuit from the first application owner, a request to identify roles that include any of the respective plurality of actions of the first application from among the plurality of roles;

in response to receiving the request to identify the roles, looking up, by the APO circuit in the role database, the roles that include any of the respective plurality of actions of the first application from among the plurality of roles in order to identify the roles and the included actions of the first application for the roles; and providing, by the APO circuit to the first application owner, the identified roles, comprising for each such identified role and included action of the first application for the role, providing the included action and permission level of the respective plurality of permission levels of the included action for the role.

3. The method of claim 2, further comprising:
receiving, by the APO circuit from the first application owner, a request to modify the data access of one of the identified roles as controlled by the first application through one of the included actions for the one of the identified roles, wherein the request to modify the data access of the one of the identified roles is further to modify the data access for the one of the identified roles by the one of the included actions to one of the permission levels of the respective plurality of permission levels of the one of the included actions; and in response to receiving the request to modify the data access of the one of the identified roles, updating, by the APO circuit, the role database to modify the one of the identified roles to reflect the request to modify the data access of the one of the identified roles.

4. The method of claim 1, further comprising:
receiving, by the APO circuit from the first application owner, a waiver to approve requests for the first role for a particular period of time; and in response to receiving the waiver, for the particular period of time, updating, by the APO circuit, the role database to modify the first role to reflect the request.

5. The method of claim 4, further comprising:
receiving, by the APO circuit from the first role owner, another request to modify the data access for the first role as controlled by the first application through a second action of the respective plurality of actions of the first application, wherein the other request is further to modify the data access for the first role by the second action to a second permission level of the respective plurality of permission levels of the second action; and in response to receiving the waiver and the other request to modify the data access for the first role, for the particular period of time, updating, by the APO circuit, the role database to modify the first role to reflect the other request.

6. An actions and permissions ownership (APO) device for managing access to data of an enterprise for a plurality of roles as controlled by a plurality of applications of the enterprise, each application accessing the data through a respective plurality of actions, each action having a respective plurality of permission levels with which to restrict the data access by the action, the APO device comprising:

a processing unit;

a non-transitory computer readable medium;

logic to receive a request from an owner of a first role of the plurality of roles to modify the data access for the first role as controlled by a first application of the plurality of applications through a first action of the respective plurality of actions of the first application, wherein the request is further to modify the data access for the first role by the first action to a first permission level of the respective plurality of permission levels of the first action;

logic to, in response to receiving the request, look up an owner of the first application in a non-transitory electronic APO database;

logic to request an approval from the first application owner to modify the data access for the first role by the first action to the first permission level;

logic to receive the approval from the first application owner to modify the data access for the first role;

logic to, in response to receiving the approval, update a non-transitory electronic role database to modify the first role to reflect the request;

logic to, in response to receiving the rejection, notify the first role owner of the rejection;

logic to receive a request from the first application owner to register a second action to the respective plurality of actions of the first application along with a respective plurality of permission levels of the second action in the APO database; and logic to, in response to receiving the request to register the second action, update the APO database to register the second action and the respective plurality of permission levels of the second action to the first application in the APO database.

7. The APO device of claim 6, further comprising:

logic to receive a request from the first application owner to identify roles that include any of the respective plurality of actions of the first application from among the plurality of roles;

logic to, in response to receiving the request to identify the roles, look up in the role database the roles that include any of the respective plurality of actions of the first application from among the plurality of roles in order to identify the roles and the included actions of the first application for the roles; and logic to provide to the first application owner the identified roles, comprising logic to, for each such identified role and included action of the first application for the role, provide the included action and permission level of the respective plurality of permission levels of the included action for the role.

8. The APO device of claim 7, further comprising:

logic to receive a request from the first application owner to modify the data access of one of the identified roles as controlled by the first application through one of the included actions for the one of the identified roles, wherein the request to modify the data access of the one of the identified roles is further to modify the data access for the one of the identified roles by the one of the included actions to one of the permission levels of the respective plurality of permission levels of the one of the included actions; and logic to, in response to receiving the request to modify the data access of the one of the identified roles, update the role database to modify the one of the identified roles to reflect the request to modify the data access of the one of the identified roles.

9. The APO device of claim 6, further comprising:

logic to receive a waiver from the first application owner to approve requests for the first role for a particular period of time; and logic to, in response to receiving the waiver, for the particular period of time, update the role database to modify the first role to reflect the request.

10. The APO device of claim 9, further comprising:

logic to receive another request from the first role owner to modify the data access for the first role as controlled by the first application through a second action of the respective plurality of actions of the first application, wherein the other request is further to modify the data access for the first role by the second action to a second permission level of the respective plurality of permission levels of the second action; and logic to, in response to receiving the waiver and the other request to modify the data access for the first role, for the particular period of time, update the role database to modify the first role to reflect the other request.

11. A non-transitory computer-readable medium (CRM) storing instructions that, when executed on a computer processor, cause the processor to carry out a process of actions and permissions ownership (APO) for managing access to data of an enterprise for a plurality of roles as controlled by a plurality of applications of the enterprise, each application accessing the data through a respective plurality of actions, each action having a respective plurality of permission levels with which to restrict the data access by the action, the process comprising:

receiving a request from an owner of a first role of the plurality of roles to modify the data access for the first role as controlled by a first application of the plurality of applications through a first action of the respective plurality of actions of the first application, wherein the request is further to modify the data access for the first role by the first action to a first permission level of the respective plurality of permission levels of the first action;

in response to receiving the request, looking up an owner of the first application in a non-transitory electronic APO database;

requesting an approval from the first application owner to modify the data access for the first role by the first action to the first permission level;

receiving the approval from the first application owner to modify the data access for the first role;

in response to receiving the approval, updating a non-transitory electronic role database to modify the first role to reflect the request;

in response to receiving the rejection, notifying the first role owner of the rejection;

receiving a request from the first application owner to register a second action to the respective plurality of actions of the first application along with a respective plurality of permission levels of the second action in the APO database; and in response to receiving the request to register the second action, updating the APO database to register the second action and the respective plurality of permission levels of the second action to the first application in the APO database.

12. The CRM of claim 11, wherein the process further comprises:

receiving a request from the first application owner to identify roles that include any of the respective plurality of actions of the first application from among the plurality of roles;

in response to receiving the request to identify the roles, looking up in the role database the roles that include any of the respective plurality of actions of the first application from among the plurality of roles in order to identify the roles and the included actions of the first application for the roles; and providing to the first application owner the identified roles, comprising for each such identified role and included action of the first application for the role, providing the included action and permission level of the respective plurality of permission levels of the included action for the role.

13. The CRM of claim 12, wherein the process further comprises:

receiving a request from the first application owner to modify the data access of one of the identified roles as controlled by the first application through one of the included actions for the one of the identified roles, wherein the request to modify the data access of the one of the identified roles is further to modify the data access for the one of the identified roles by the one of the included actions to one of the permission levels of the respective plurality of permission levels of the one of the included actions; and in response to receiving the request to modify the data access of the one of the identified roles, updating the role database to modify the one of the identified roles to reflect the request to modify the data access of the one of the identified roles.

14. The CRM of claim 11, wherein the process further comprises:

receiving a waiver from the first application owner to approve requests for the first role for a particular period of time; and in response to receiving the waiver, for the particular period of time, updating the role database to modify the first role to reflect the request.

15. The CRM of claim 14, wherein the process further comprises:

receiving another request from the first role owner to modify the data access for the first role as controlled by the first application through a second action of the respective plurality of actions of the first application, wherein the other request is further to modify the data access for the first role by the second action to a second permission level of the respective plurality of permission levels of the second action; and in response to receiving the waiver and the other request to modify the data access for the first role, for the particular period of time, updating the role database to modify the first role to reflect the other request.

* * * * *